INVENTOR.

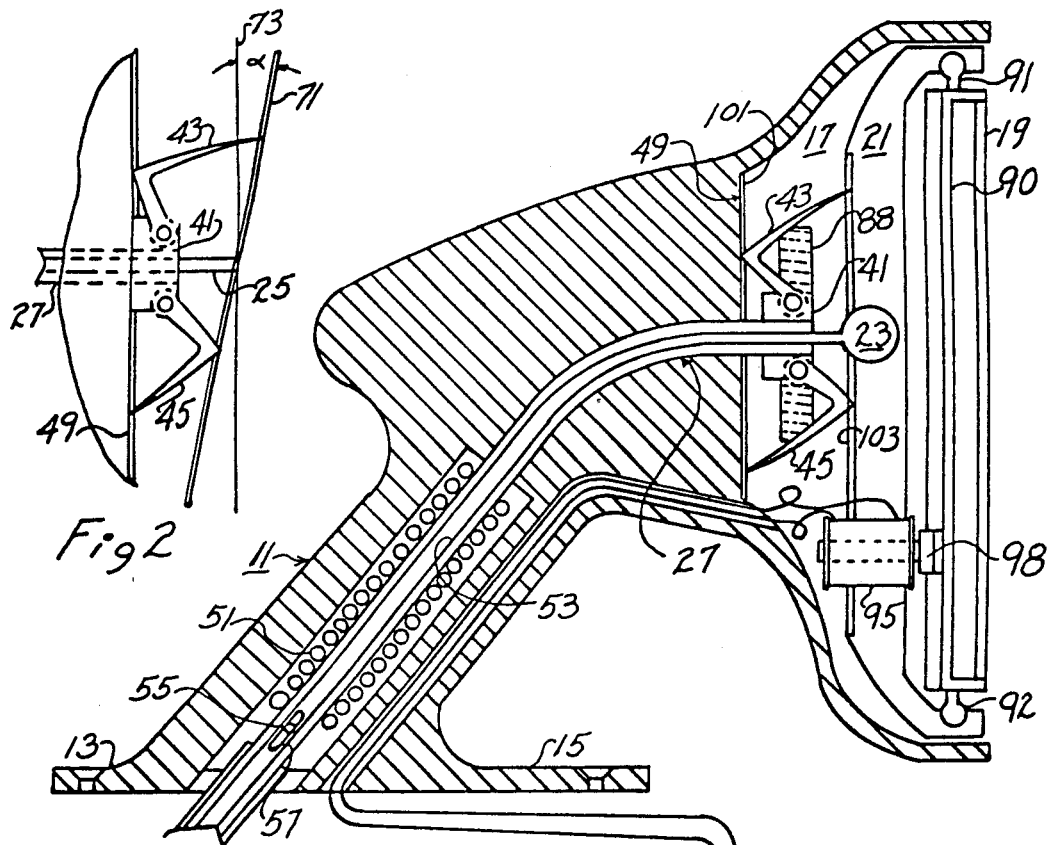

United States Patent Office 3,666,354
Patented May 30, 1972

3,666,354
COMBINATION ELECTRICALLY AND MECHAN-
ICALLY OPERATED DAY AND NIGHT REMOTE
CONTROLLED OUTSIDE MIRROR
Carl D. Russell, 1502 S. Boulder St., Tulsa, Okla. 74119
Filed Oct. 5, 1970, Ser. No. 78,011
Int. Cl. B60r 1/06; G02b 7/18
U.S. Cl. 350—281                                    7 Claims

ABSTRACT OF THE DISCLOSURE

This invention relates to apparatus for positioning and locking a vehicle mirror and its backing. A housing pivotally supports the mirror, its backing and case therefore, and includes a wall spaced from the case. Pivotal means in the form of a plurality of angular leg elements pivotally supported from a common support are disposed between the wall and the case for changing the position of the mirror case relative to the wall. Resilient means normally urge the case against the pivotal means to lock the mirror in set viewing position. Electromagnetic coils and a bar magnet lock the mirror in either day or night position.

The present invention relates to an electromechanical assembly capable of remotely positioning an element, such as an outside mirror for a vehicle. The mechanical components enable full tilting, angling, and panning adjustment of the mirror element through attachment to its case with a mechanically locking memory for holding the mirror in a set position in which the mirror is locked in order that wind, vibration, or other factors will not disturb the selected position. The mirror element is pivotal relative to its case and the electrical arrangement deflects the mirror element and line of view away from and toward the vehicle for reducing glare and for brighter images.

This invention is an improvement over my earlier Pat. No. 3,466,941, entitled Mechanically Operated Remote Control Outside Mirror Device dated Sept. 16, 1969, and my Pat. 3,475,081, entitled Fine Line Outside Mirror, dated Oct. 28, 1969.

The present invention provides the combined structure or movement of the prior inventions in mutually compatible control and also enables a better orienting control of the case itself.

The new combination enables the employment of the bar magnet and electromagnets of the latter identified application to deflect the plane of the mirror element toward or away from the vehicle through energization of at least one selected electromagnet by attraction between the energized electromagnet and the bar magnet which is carried by the rear of the mirror element or its protective covering or backing, per se, the electromagnets being fixed in the movable case to move therewith but being supported independently of the pivotal mirror element. The cores of the electromagnets serve as stops and also enable locking of the mirror in the selected day or night position.

Also, a momentary type switch, located within the vehicle, may be employed to deflect the mirror to its day or night position at the flick of a knob which energizes the selected electromagnet or properly polarizes both electromagnets to move the bar magnet against one core at which time the knob may be released and magnetic attraction maintains the mirror in its selected position until such time as the knob is actuated for reverse polarity control or angling of the mirror to its opposite position for retention in the same manner.

The coils of the electromagnets may be connected in parallel such that energization in one polarity causes a push-pull relation in one direction and energization in the opposite polarity causes a push-pull relation to pull the bar in the other direction, thereby multiplying the power and insuring rapid positive positioning of the mirror.

The foregoing day-night control is made compatible with the mechanical positioning control in order that the operator may adjust the mirror to any desired position for his own height and position in the vehicle for optimum viewing, the electrical arrangement being capable of functioning instantly regardless of the position to which the mirror is adjusted mechanically. The electrical arrangement serves to hold the mirror in one of two positions, i.e., day or night position, with the mechanical arrangement being capable of adjusting the mirror to any position of the desired viewing angle for the operator. The arrangement employs a wedge or other suitable day-night type element thereby affording the image glare reducing or enhancing action electrically selectable.

The mechanical adjustment employs the well-known flexible cable of Bowden wire type, or equivalent, as the retaining mechanism for the case which actually serves as a double locking means for the mirror in its oriented position against wind and vibration because the element, per se, is located by the electrical means and the supporting structure for the mirror element is located by the Bowden wire being tightened against the mirror case, resiliently to fix it relative to the mounting frame by way of the mechanical orienting means.

These means comprise a spider-like apparatus in the form of opposite legs having short and long reaches, respectively, extending outwardly of a hub and pivotally attached thereto. The hub is fixed to an outer sheath of the Bowden wire and the hub and legs are disposed between the mirror case and the supporting structure for the case. The short reach of one leg contacts the case and the long reach of the same leg contacts a wall of the mounting or housing with the opposite disposition being present for the other leg. Thus, the spider legs are oppositely connected to the block or hub in order that movement of the block in one direction, i.e., toward the mirror case, causes the positioning or orienting means to exert a tilting or angling force in one direction, whereas movement of the block away from the mirror case causes the mirror case to tilt or angle in the opposite direction.

The outer sheath may be rotated to rotate the positioning means to orient the spider leg members such that they may cause the mirror case to be tilted, angled, or panned as desired, the positioning member being free to occupy any position around a 360° circle, relative to the mirror case, so as to tilt or angle or pan the mirror to any desired orientation.

A button or release means is provided within the vehicle to permit the spring tension to be released, thereby freeing the case. It is connected to the outer sheath to rotate the hub and spider arms.

A threaded knob, or micrometer adjustment, is remotely fixed to the hub so that it may move the latter when the release button is depressed with the threads of the micrometer serving to maintain the in and out positioning of the hub when the release button is released.

Additionally, the mirror is locked in the desired position by the positioning or orienting member having its legs or ridges bearing against or into relatively soft materials coated or affixed to the mirror case and the wall of the housing, such that the spider legs bite into the soft material and the resilient force maintains the fixed positioning until the release control releases the assembly for different orientation.

With the foregoing in mind, it is an object of this invention to provide apparatus for remotely positioning and locking a mirror element in any of multiple desired positions and orientation.

It is a further object of the invention to provide such an assembly for tilting, panning, and angling an outside vehicle mirror from a remote control station within the vehicle while also affording day-night type control of the mirror element, per se.

A still further object of the invention is the provision of means for automatically locking the mirror element in one of two positions and its case in any of various orientations.

Another object of the invention is the provision of an electromagnetic apparatus manually orienting a remotely controlled mirror relative to the operator of a vehicle and for electrically additionally operating the mirror element to one of two predetermined positions.

The invention will be further described in detail in connection with the illustration of a preferred embodiment thereof, as shown in the attached drawings wherein:

FIG. 1 is a cross-sectional view of a mirror and mounting assembly therefor with FIG. 1a depicting, also in section, remote controls for positioning the mirror;

FIG. 2 is a partial view, in elevation, showing the positioning or orienting means for the mirror element;

FIG. 3 is a detailed view, in cross-section, of a pin and slot for cooperation with resilient means.

Figure 4:
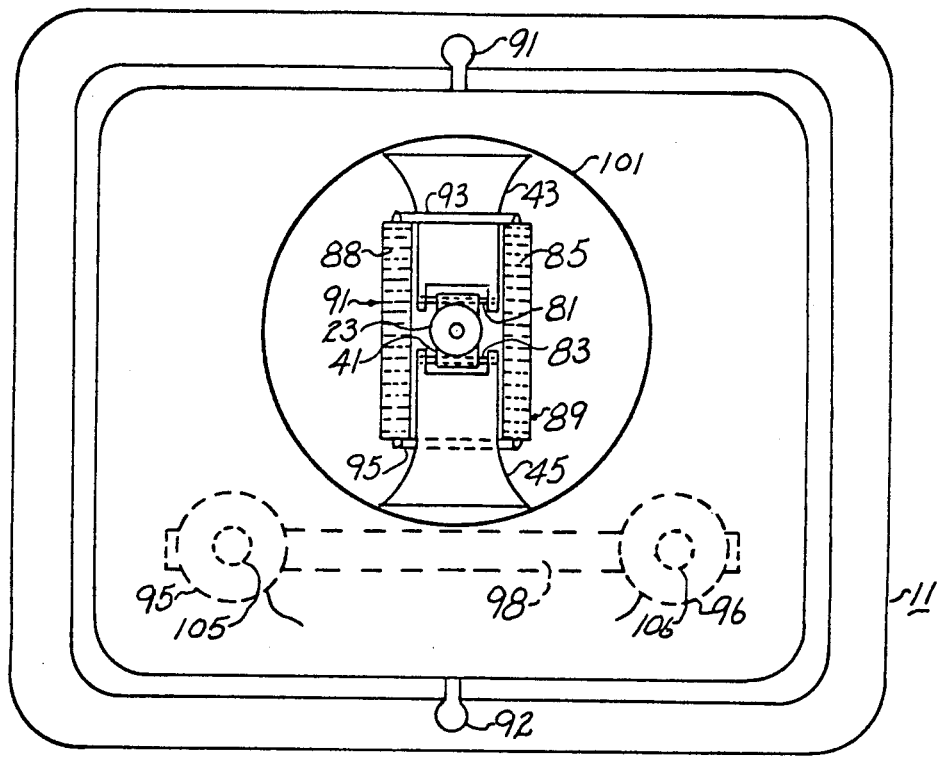
FIG. 4 is a front view of the positioning or orienting means and mirror connector ball with mirror element removed.

Referring now to the drawings and particularly to FIG. 1, there is shown a mirror assembly comprising a housing 11 having flanges 13 and 15 for attachment to a surface of a vehicle and a tapered or semi-cylindrical upper portion 17 for the mirror element 19. The mirror element 19 may comprise a circular or rectangular mirror held in case 21 and freely supported for tilting or angling movement within the mouth of the portion 17.

The support is provided by or from ball 23, preferably universally mounted in case 21, and carried by flexible wire 25 in sheath 27. The wire 25 and sheath 27 may comprise a conventional Bowden wire arrangement so long as the sheath 27 will rotate with wire 25.

The wire 25 and sheath 27 extend to a remote control station generally designated at 29 (FIG. 1a) which in the case of vehicular attachment, would be in the interior of the vehicle, a protective covering 31 for sheath 27 being included between station 29 (FIG. 1a) and the housing 11.

A frame 32 is fixed to the vehicle and carries threads 33 which space threaded position control knob 35 relative to support 32. The right hand end of sheath 27 is embedded or otherwise attached to position control knob 35 being rotatable in knob 35 and is affixed securely to block or hub 41 within housing portion 17 at the other end.

The block or hub 41, in combination with the spider legs or arms 43 and 45, provides a positioning means for case 21 with spider legs 43 and 45 extending across the space between a wall 49 of upper housing 17 and the back of case 21, thus temporarily fixing the position of block 41, such that the position control knob 35 cannot be turned further until released because the mirror case 21 is biased in the direction of wall 49 by spring 51 located in recess 53 of the housing 17. This spring bears against a pin 55 protruding through slot 57 to force the ball 23 to urge the case 21 in the direction of wall 49. The release mechanism is under the control of push button 61 (FIG. 1a). Movement of the push button 61 to the left in FIG. 1a causes wire 25 to move ball 23 to the right, thereby releasing the forces holding the assembly in static condition. Now, position control knob 35 can be unscrewed to the right, thus pulling sheath 27. This in turn pulls block or hub 41 to the left, and causes spider leg 43 to pivot thereby further tilting the case 21.

FIG. 2 shows a tilting effect wherein block 41 has been moved completely (by sheath 27) to its left hand position, against wall 49 and the mirror has been tilted to one extreme position, the plane of the mirror being indicated by line 71, the angle of tilt by the symbol for alpha, and the normal position plane of the mirror at 73.

Return of the mirror case 21 from the position of plane 71 to the position of plane 73 is effected manually by screwing the control knob 35 (micrometer adjustment) to the left following the accompanying release of button 61, to return block 41 to the position shown in FIG. 1. Opposite tilting from plane 73 is attained by pushing release button 61 in, releasing the pressure from the spiders, and then rotating release button 61 by 180° and leaving knob 35 alone. In and out of the knob 35 determines the amount of the angle α and rotation of the spider is under control of the release button 61.

In FIG. 4, the spider legs 43 and 45 are seen in front elevation. Leg 43 is pivotally connected to block or hub 41 by shaft 81 and spider leg 45 is pivotally assembled thereto by pin 83. A pair of springs 85 and 88 are contained respectively in containers 89 and 91. Cross members 93 and 95 connect the springs to the spider legs, such that the springs tend to draw the legs together but the containers limit the action to fix the spacing between the spider legs.

One of the locking features of the invention resides in the fact that the tip ends of the spider legs 43 and 45 (and, if desired, the knees thereof) are sharpened (or serrated) to bear into the surface which they contact. Preferably the wall 49 is covered with a soft plastic, rubber, or other pliable material 101, as is also true at 103 of the surface of mirror case 21, whereby the mirror case is automatically locked in each position assumed.

This is particularly desirable when it is realized that the spider mechanism comprising legs 43 and 45 may be rotated through 360° in order to tilt the mirror in the vertical plane, horizontal plane, or anywhere inbetween.

The mirror can only be tilted forwardly and downwardly at the top (in a clockwise direction and back) with the mechanism set in the position with spider arm 43 above spider arm 45. If it is desired, for example, to observe the sky, release button 61 is simply rotated 180° and the case 21 may then be tilted to a limit counterclockwise position and returned, spider leg 43 driving from the lower surface of case 21.

It should be apparent now that the spider mechanism may be operative using other elements. For example, triangular members having short and long reaches could be substituted for spider legs 43 and 45, as is also the case with wedges, hyperbolically-shaped elements or the like. Similarly, a plurality of elements, such as the spider legs or substitutes therefor may be employed. The provision of more than two elements enables tilting and angling of the mirror 21 simultaneously and in a direction determined by the location and arrangement of the legs.

The operation of the electrical control will now be described with particular reference to FIGS. 4 through 7. First, in FIG. 1, the day-night mirror element 19 and its backing or support 90 is shown pivotally mounted in case 21 at pivot points 91 and 92, such that mirror element 19 may be pivoted relative to electromagnets 95 and 96, suitably fixed in case 21.

Affixed to the rear surface of backing 90 is a bar or strip magnet 98 which is preferably polarized in the usual north-south manner. The electromagnets 95 and 96 are spaced apart (as is best seen in FIG. 4) and their cores 105 and 106 are disposed near opposite ends of magnet 98.

The electromagnets are connected in parallel and energized over leads 133 and 135 (FIGS. 1 and 5) which extend to a remotely located switch 139 having an actuating knob 141.

The switch is usually located within the vehicle to permit angling of the mirror away from the car whenever the reflected image is bothersome to the driver or passenger, whichever the case may be. This usually occurs at night, and angling of the mirror away from the car enables the driver to observe the second image rather than the first image which is troublesome.

Figure 7:
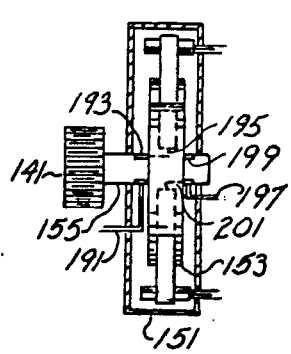
FIG. 7 is a view in cross section of the switch of FIG. 6.
Figure 6:
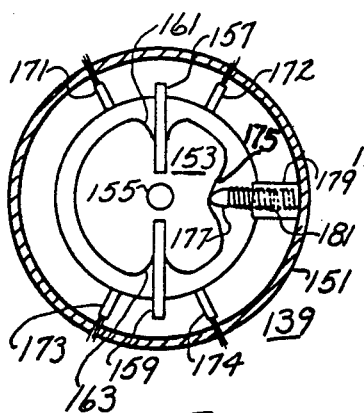
FIG. 6 is a view partly in plan and partly in section of an inexpensive but effective reversing switch with automatic home provision.

The switch comprises a housing 151 shown in FIGS. 6 and 7 which supports a rotor 153 adapted to be turned by knob 141 via shaft 155. The rotor includes radial spring blades 157 and 159 which are secured thereto in rotor recesses 161 and 163. The material of the blades 157 and 159 is preferably of spring steel and the recesses are provided to permit better use of the resiliency of the switch blades in engaging contacts 171, 172, 173, and 174. The rotor 153 is further provided with a camming recess or peripheral groove 175 in cooperation with the plunger 177 disposed in tubular portion 179 of the housing 151 and urged against the rotor 153 by spring 181.

The recess 175 is shown somewhat exaggerated and would usually have a higher degree of curvature in order to assure returning of the rotor 153 to the home position (the position shown) when the operator removes his hand from knob 141.

Contact is made to the switch blade 157 by way of lead 191 connected to sleeve or partial sleeve 193 and extended via internal lead 195. Similarly connection is made to blade 159 over external lead 197, sleeve 199 and internal lead 201. Although a plurality of leads are shown in each instance, e.g. leading out of terminal 171, it is noted that a single lead will suffice for the application of this type control, as is best seen in FIG. 5.

Figure 5:
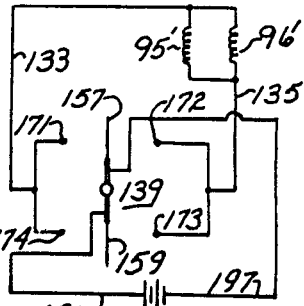
FIG. 5 is a circuit diagram for operation from the vehicle electrical system to reverse the polarity of the electromagnets.

In the circuit diagram of FIG. 5 coils 95' and 96' of electromagnets 95 and 96 are connected in parallel and are supplied power from the vehicle battery 209 over leads 191 and 197 and via the control switch 139, for selective polarization in either direction. Thus contacts 172 and 173 are connected together to enable lead 135 to be negative when blade 157 makes contact with contact 172 and to be positive when blade 159 makes contact with contact 173. At the same time, the opposite polarity is applied to contact 171 and 174 respectively by the blades 157 and 159 in selective manner. Thus, blade 159 would make lead 133 positive when blade 157 made lead 135 negative to polarize the coils 95' and 96' in one direction for movement of bar magnet 98, mirror backing 90, and mirror element 19 to one angled position wherein contact of the bar magnet 98 with one of the cores 105 and 106 of electromagnets 95 and 96 limits the angular movement with the bar magnet 98 serving to latch onto the selected core even when the knob 139 is released and the blades 157 and 159 spring back to the home position of FIG. 6 under the control of plunger 177 camming to center position along recess 175. The angle through which the mirror turns is small so the spacing between cores 105 and 106 and magnet 98 is only a fraction of an inch as seen in FIG. 1.

What is claimed is:

1. Apparatus for positioning and locking a mirror and its backing comprising in combination, a case pivotally supporting the mirror and its backing; a housing for the case; said housing including a wall spaced from the case; pivotal means disposed between the wall and case for changing the position of the case relative to the wall; said pivotal means comprising a plurality of angular leg means and a common support therefor; said leg means being pivotally connected to said common support; means normally urging the case against the pivotal means; means for releasing said normally urging means and for rotating said pivotal means during the release; means adjustably maintaining the position of the pivotal means between releases; electromagnetic means carried by the case; a bar magnet affixed to the mirror backing in opposed relation to the electromagnetic means; and means for pivoting the mirror to one of two predetermined positions through energization of the electromagnetic means.

2. The apparatus of claim 1 wherein each of said leg means comprises arms having a short reach and a long reach oriented respectively at angles thereto.

3. The apparatus of claim 2 wherein the means normally urging the case comprises a spring, a flexible cable and ball with the ball universally engaging the case and the flexible cable extending via the housing to a remote location; said spring pinned to the cable and contained by the housing; a movable sheath about said cable connected to said common support and extending to said remote location; said means for releasing said normally urging means comprising a button connected to said flexible cable at the remote location; and said means for maintaining the position of said pivotal means between said releases comprising a micrometer.

4. The apparatus of claim 1 wherein said means for pivoting the mirror to two predetermined positions actually pivots the mirror to the right to one position and to the left to the other.

5. Apparatus for remotely positioning a mirror and its backing comprising in combination, a case pivotally mounting the mirror and its backing; a housing for the mirror case; a wall in said housing spaced from the mirror case with the case of the mirror being substantially parallel to the wall when the mirror is in the one position; angular means extending between the wall and the mirror case and in contact with each of them; hub means connecting said angular means for pivotal movement relative to each other and relative to said hub means; said angular means being substantially of V-shaped configuration and extending in reverse configuration from said hub means; means retaining the case against the angular means and the angular means against the wall; means supporting the hub means; means biasing the supporting means and the retaining means in the direction of the wall; means for releasing the biasing means maintaining the mirror case; locking means to move the hub means in the direction toward and away from the wall causing the angular means to change the orientation of the mirror nd its backing relative to the case; a pair of electromagnets supported in spaced apart positions by the case; a magnet attached to the backing in opposed relation to said electromagnets and having a north and a south pole; an electrical circuit for energizing the electromagnets; switching means in said circuit adapted to energize at least one of said electromagnets whereby the magnet is drawn in contact with one of the electromagnets to anchor the mirror in one of two predetermined positions; and the electrical attraction of the bar magnet for the electromagnet retains the mirror in said one of two predetermined positions after said electromagnet is de-energized.

6. The apparatus of claim 5 further comprising a remote station having a frame; said releasing means and said locking means extending to the frame; and said locking means comprising micrometer adjustment means movable relative to the frame to fix the position of the hub means relative to said wall.

7. The apparatus of claim 5 wherein said means for pivoting the mirror to two predetermined positions actually pivots the mirror to the right to one position and to the left to the other.

References Cited

UNITED STATES PATENTS

| | | | |
|---|---|---|---|
| 3,466,941 | 9/1969 | Russell | 350—279 X |
| 3,475,081 | 10/1969 | Russell | 350—279 |

JOHN K. CORBIN, Primary Examiner

U.S. Cl. X.R.

74—501 M